United States Patent
Kyono

(10) Patent No.: US 9,356,521 B2
(45) Date of Patent: *May 31, 2016

(54) SWITCHING POWER-SUPPLY DEVICE HAVING WIDE INPUT VOLTAGE RANGE

(71) Applicant: Sanken Electric Co., LTD., Niiza-shi, Saitama (JP)

(72) Inventor: Yoichi Kyono, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 260 days.

This patent is subject to a terminal disclaimer.

(21) Appl. No.: 14/168,038

(22) Filed: Jan. 30, 2014

(65) Prior Publication Data
US 2015/0214844 A1   Jul. 30, 2015

(51) Int. Cl.
*H02M 3/335* (2006.01)
*H02M 1/00* (2006.01)

(52) U.S. Cl.
CPC ...... *H02M 3/33507* (2013.01); *H02M 3/33569* (2013.01); *H02M 2001/0058* (2013.01); *Y02B 70/1491* (2013.01)

(58) Field of Classification Search
CPC ..................................................... H02M 3/335
USPC .......................................... 363/17, 56.04, 98
See application file for complete search history.

(56) References Cited

U.S. PATENT DOCUMENTS

| | | | |
|---|---|---|---|
| 9,071,155 B2 | 6/2015 | Uno | |
| 2002/0075698 A1 | 6/2002 | Kuranuki et al. | |
| 2008/0186742 A1* | 8/2008 | Seong ................. | H02M 3/3376 363/17 |
| 2009/0059622 A1* | 3/2009 | Shimada ........... | H02M 3/33584 363/17 |
| 2009/0290385 A1* | 11/2009 | Jungreis .............. | H02M 1/4241 363/17 |
| 2010/0014321 A1* | 1/2010 | Won .................... | H02M 3/3376 363/17 |
| 2010/0328968 A1 | 12/2010 | Adragna et al. | |

(Continued)

FOREIGN PATENT DOCUMENTS

| | | |
|---|---|---|
| JP | H09-308243 A | 11/1997 |
| JP | 2002-209383 A | 7/2002 |

(Continued)

OTHER PUBLICATIONS

Feb. 17, 2016—(US) Notice of Allowance—U.S. Appl. No. 14/601,677.

(Continued)

*Primary Examiner* — Jeffrey Sterrett
(74) *Attorney, Agent, or Firm* — Banner & Witcoff, Ltd.

(57) ABSTRACT

Provided is a highly-efficient switching power-supply device having a wide input voltage range. The switching power-supply device includes: a first series circuit including first and second switching elements and a second series circuit including third and fourth switching elements, which are connected in parallel with a power supply; a series resonance circuit including a primary coil and a capacitor connected in parallel with the second switching element; a reactor connected between a connection point of the third and fourth switching elements and the capacitor; a transformer having the primary coil and a secondary coil; and a control circuit that turns on-and-off the first and second switching elements, alternately, and turns on-and-off the third and fourth switching elements, alternately. The control circuit switches the first and second series circuits when an input voltage is low and switches only the first series circuit when the input voltage is high.

7 Claims, 7 Drawing Sheets

(56) References Cited

U.S. PATENT DOCUMENTS

| | | | |
|---|---|---|---|
| 2011/0103097 A1* | 5/2011 | Wang | H02M 3/33592 363/17 |
| 2011/0103098 A1* | 5/2011 | Wu | H02M 1/36 363/17 |
| 2012/0014138 A1* | 1/2012 | Ngo | H02M 3/33584 363/17 |
| 2012/0170324 A1* | 7/2012 | Fornage | H02M 3/337 363/17 |
| 2012/0262953 A1 | 10/2012 | Jungreis et al. | |
| 2013/0265804 A1* | 10/2013 | Fu | H02M 3/33576 363/17 |
| 2013/0314949 A1* | 11/2013 | Chi | H02M 1/32 363/17 |
| 2014/0009968 A1* | 1/2014 | Matsuura | H02M 3/33507 363/17 |
| 2014/0009985 A1 | 1/2014 | Figge et al. | |
| 2014/0036545 A1* | 2/2014 | Reddy | H02M 3/3376 363/17 |
| 2014/0098574 A1 | 4/2014 | Hara et al. | |
| 2014/0254203 A1* | 9/2014 | Dai | H02M 3/3353 363/17 |
| 2014/0376270 A1* | 12/2014 | Kern | H02M 3/33507 363/17 |
| 2015/0055374 A1 | 2/2015 | Yamashita et al. | |
| 2015/0078036 A1* | 3/2015 | Jovanovic | H02M 1/10 363/17 |
| 2015/0092450 A1* | 4/2015 | Feno | H02M 3/33592 363/17 |
| 2015/0207419 A1* | 7/2015 | Kyono | H02M 3/33507 363/17 |
| 2015/0214844 A1* | 7/2015 | Kyono | H02M 3/33507 363/21.02 |
| 2015/0229216 A1* | 8/2015 | Kyono | H02M 3/33507 363/17 |

FOREIGN PATENT DOCUMENTS

| | | |
|---|---|---|
| JP | 2005-033956 A | 2/2005 |
| JP | 2013-063003 A | 4/2013 |

OTHER PUBLICATIONS

Mar. 9, 2016—(US) Notice of Allowance—U.S. Appl. No. 14/178,446.

Figge, H.; Grote, T.; Froehleke, N.; Boecker, J.; Ide, P., "Paralleling of LLC resonant converters using frequency controlled current balancing," Power Electronics Specialists Conference, 2008. PESC 2008. IEEE , vol., No., pp. 1080-1085, Jun. 15-19, 2008.

Aug. 5, 2015—(US) Non-Final Office Action—U.S. Appl. No. 14/178,446.

Nov. 19, 2015—(US) Final Office Action—U.S. Appl. No. 14/178,446.

Oct. 8, 2015—(US) Non-Final Office Action—U.S. Appl. No. 14/601,677.

\* cited by examiner

SWITCHING POWER-SUPPLY DEVICE HAVING WIDE INPUT VOLTAGE RANGE

TECHNICAL FIELD

This disclosure relates to a switching power-supply device.

BACKGROUND ART

A power supply of an electronic device such as a television, a smart phone, a PC and the like should stably supply a constant direct-current voltage. As the power supply, a switching power-supply device is used (for example, refer to JP-A-2013-63003).

A switching power-supply device uses, as a switching element, a semiconductor device such as a MOSFET (Metal-Oxide-Semiconductor Field-Effect Transistor), an IGBT (Insulated Gate Bipolar Transistor), a thyristor and the like and converts an input direct-current voltage into an alternating-current voltage by an on-off operation of the switching element. The converted alternating-current voltage passes through a transformer, a rectification circuit and a smoothing circuit in that order, is converted into a stable direct-current voltage and is then output.

In the switching power-supply device, a switching frequency is controlled depending on the output voltage, thereby stabilizing the output voltage. However, in a situation where the output voltage is largely changed (for example, lowering of the input voltage due to instantaneous interruption or power failure or heavy load), even when the switching frequency is reduced, it is difficult to constantly maintain the output voltage.

According to the switching power-supply device disclosed in JP-A-2013-63003, a front stage of a DC-DC converter is provided with a boost circuit, and a setting voltage of the boost circuit is set to be a rated input voltage or lower. Thereby, the boost circuit stops a switching operation while the rated input voltage is input, thereby reducing a switching loss in the boost circuit. Also, when the input voltage is lowered due to the power failure and the like, the boost circuit starts the switching operation to thus constantly maintain the voltage to be input to the DC-DC converter of a rear stage. Thereby, an input voltage range of the DC-DC converter connected to the rear stage is narrowed to enable a design of high efficiency.

SUMMARY

According to the power-supply device disclosed in JP-A-2013-63003, since the switching operation of the boost circuit is stopped at a steady state, an increase of the loss due to the addition of the boost circuit is suppressed. However, the boost circuit includes a reactor or diode that is connected in series with the input power supply, and the current flows to the corresponding devices even when the boost circuit is not operating. For this reason, conduction loss occurs, and thus the efficiency is lowered.

This disclosure has been made keeping in mind the above situation, and an object is to provide a highly-efficient switching power-supply device having a wide input voltage range.

A switching power-supply device of the disclosure includes: a transformer, which has a primary coil and a secondary coil that is magnetically coupled with the primary coil; a first series circuit of a first switching element and a second switching element, the first series circuit being connected to both ends of a direct-current power supply; a series resonance circuit, which includes a capacitor connected to one end of the second switching element and the primary coil connected between the capacitor and the other end of the second switching element; a second series circuit of a third switching element and a fourth switching element, the second series circuit being connected to both ends of the direct-current power supply; a reactor, which is connected between a connection point of the third switching element and the fourth switching element and a terminal of the capacitor facing the primary coil; a rectification-and-smoothing circuit, which is connected to the secondary coil, and a control unit that performs: switching control of turning on-and-off the first switching element and the second switching element, alternately, with dead time in which the first switching element and the second switching element become off; and switching control of turning on-and-off the third switching element and the fourth switching element, alternately, with dead time in which the third switching element and the fourth switching element become off while making frequencies of switching signals of the first series circuit and the second series circuit be the same, the control unit selectively switches and performs: a first control of performing the switching control of the first series circuit at a state where the switching control of the second series circuit is stopped; and a second control of performing the switching control of the second series circuit at a state where the switching control of the first series circuit is performed.

According to the disclosure, an object is to provide a highly-efficient switching power-supply device having a wide input voltage range.

DETAILED DESCRIPTION OF ILLUSTRATIVE EMBODIMENTS

Hereinafter, illustrative embodiments of the disclosure will be described with reference to the drawings.

Figure 1:
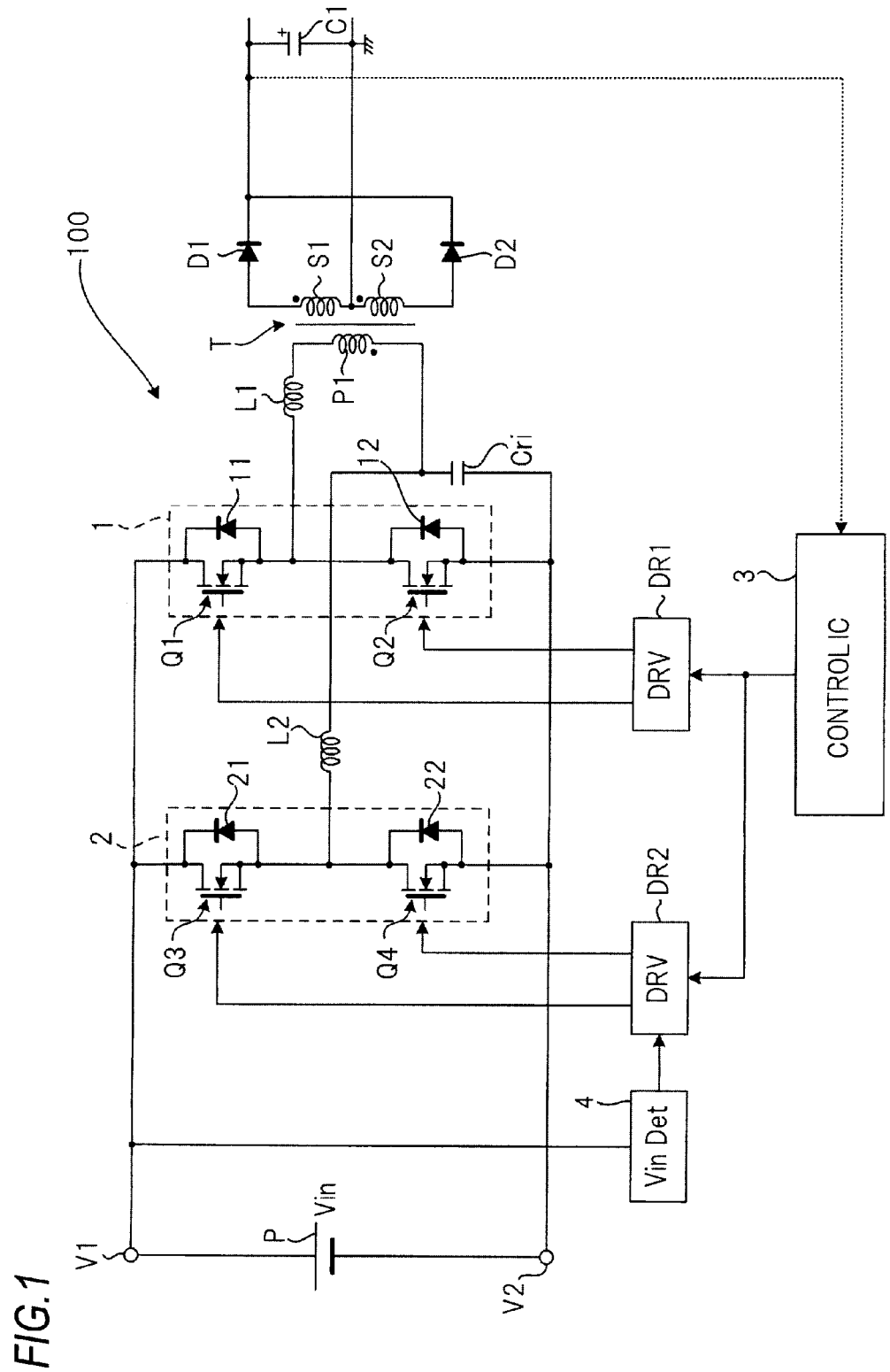
FIG. 1 is a circuit diagram showing a schematic configuration of a switching power-supply device 100 for illustrating an illustrative embodiment of this disclosure.

FIG. 1 is a circuit diagram showing a schematic configuration of a switching power-supply device 100 for illustrating an illustrative embodiment of this disclosure.

The switching power-supply device 100 has a terminal V1 that is connected to one end of a direct-current power-supply P, which supplies a direct-current voltage Vin obtained by rectifying and smoothing an alternating-current voltage from a commercial power supply, for example, a terminal V2 that is connected to the other end (a ground end) of the direct-current power-supply P, series circuits 1 and 2 that are respectively connected in parallel with the direct-current power-supply P, reactors L1 and L2, a capacitor Cri, a transformer T, diodes D1 and D2, a capacitor C1, a control circuit (control IC) 3, an input voltage detection circuit (Vin Det) 4 and drivers DR1 and DR2. The drivers DR1 and DR2, the control circuit 3 and the input voltage detection circuit 4 function as a control unit.

The series circuit 1 includes a switching element Q1 (a MOSFET in the example of FIG. 1) configured by a semiconductor device that can be on-and-off controlled, such as a MOSFET, a IGBT, a thyristor and the like, a switching element Q2 (a MOSFET in the example of FIG. 1) that is connected in series with the switching element Q1, a diode 11 that is connected to both ends of the switching element Q1 and a diode 12 that is connected to both ends of the switching element Q2. The diode 11 may be a parasitic diode of the switching element Q1 and the diode 12 may be a parasitic diode of the switching element Q2.

The series circuit 2 includes a switching element Q3 (a MOSFET in the example of FIG. 1), a switching element Q4 (a MOSFET in the example of FIG. 1) that is connected in series with the switching element Q3, a diode 21 that is connected to both ends of the switching element Q3 and a diode 22 that is connected to both ends of the switching element Q4. The diode 21 may be a parasitic diode of the switching element Q3 and the diode 22 may be a parasitic diode of the switching element Q4.

In the series circuit 1, both ends of the switching element Q2 is connected with a circuit in which the reactor L1, a primary coil P1 of the transformer T and the capacitor Cri are connected in series with each other. One end of the capacitor Cri is connected to one end of the switching element Q2, and the primary coil P1 and the reactor L1 are connected between the other end of the capacitor Cri and the other end of the switching element Q2.

The reactor L1 may be a reactor having a leakage inductance of the primary coil P1. The series circuit configured by the reactor L1, the primary coil P1 of the transformer T and the capacitor Cri configures a series resonance circuit that is connected in parallel with the switching element Q2.

The reactor L2 is connected between a connection point of the switching element Q3 and switching element Q4 of the series circuit 2 and a connection point of the capacitor Cri and primary coil P1 of the series resonance circuit. The series circuit configured by the reactor L2 and the capacitor Cri configures a resonance circuit that is connected in parallel with the switching element Q4.

The transformer T has the primary coil P1 and secondary coils S1 and S2 that are magnetically coupled with the primary coil P1.

One end (a connection point-side with the secondary coil S2) of the secondary coil S1 is connected to a ground terminal, and the other end of the secondary coil S1 is connected to an anode of the diode D1. One end (a connection point-side with the secondary coil S1) of the secondary coil S2 is connected to the ground terminal GND, and the other end of the secondary coil S2 is connected to an anode of the diode D2. Cathodes of the diodes D1 and D2 are connected to an output terminal (not shown).

The capacitor C1 is connected between the connection point of the secondary coil S1 and secondary coil S2 and the output terminal. The diodes D1 and D2 are to rectify voltages that are generated from the secondary coils S1 and S2. The capacitor C1 is to smooth the voltages that are generated from the secondary coils S1 and S2. A rectification-and-smoothing circuit is configured by the diodes D1 and D2 and the capacitor C1.

The input voltage detection circuit 4 is a circuit that detects a voltage Vin input from the power-supply P.

Although not shown in FIG. 1, the switching power-supply device 100 has a circuit for detecting a difference between an output voltage of the rectification-and-smoothing circuit of a secondary side and a target voltage. In the control circuit 3, a photo coupler for transmitting an error signal of the difference to the control circuit 3 is embedded.

The control circuit 3 has therein an oscillator and supplies a clock of a predetermined duty ratio and a predetermined frequency, which is generated in the oscillator, to the drivers DR1 and DR2. The oscillator changes an oscillation frequency in accordance with the error signal from the secondary side. Specifically, the oscillator controls the oscillation frequency so that the output voltage coincides with the target voltage.

The driver DR1 generates a gate signal (a switching signal) for driving the switching elements Q1, Q2, in accordance with the clock input from the control circuit 3, and performs switching control of the series circuit 1 alternately turning on-and-off the switching elements Q1, Q2 with dead time in which the switching elements Q1, Q2 become off.

The driver DR2 generates a gate signal (a switching signal) for driving the switching elements Q3, Q4, in accordance with the clock input from the control circuit 3, and performs switching control of the series circuit 2 alternately turning on-and-off the switching elements Q3, Q4 with dead time in which the switching elements Q3, Q4 become off.

The driver DR2 stops the switching control of the series circuit 2 when a voltage detected by the input voltage detection circuit 4 is a first threshold or larger (upon input of a rated voltage) and performs the switching control of the series circuit 2 in accordance with the clock supplied from the control circuit 3 when the voltage detected by the input voltage detection circuit 4 is lower than the first threshold.

Operations of the switching power-supply device 100 configured as described above are described.

Figure 2:
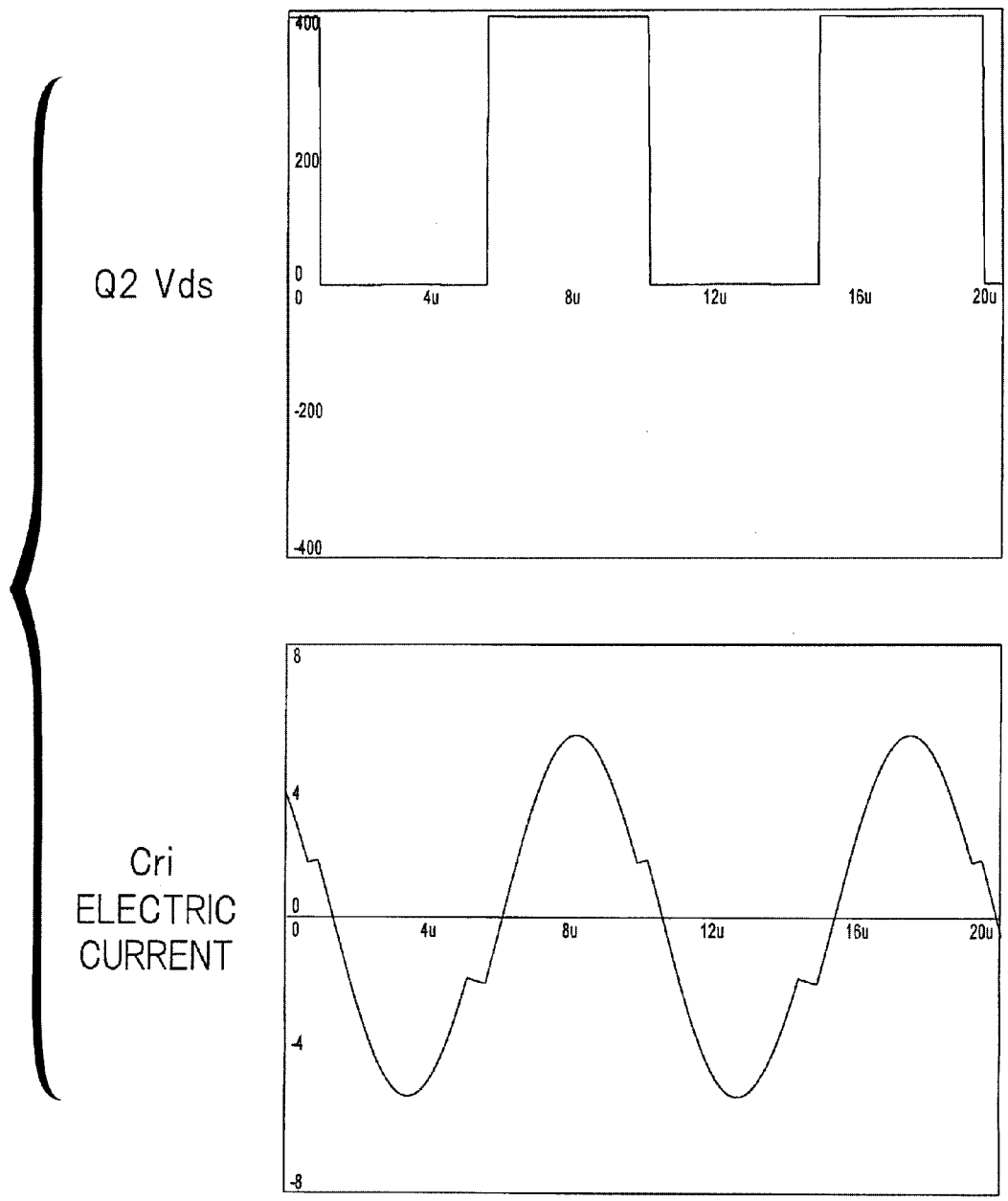
FIG. 2 illustrates an example of an operating waveform of the switching power-supply device 100 shown in FIG. 1.
Figure 3:
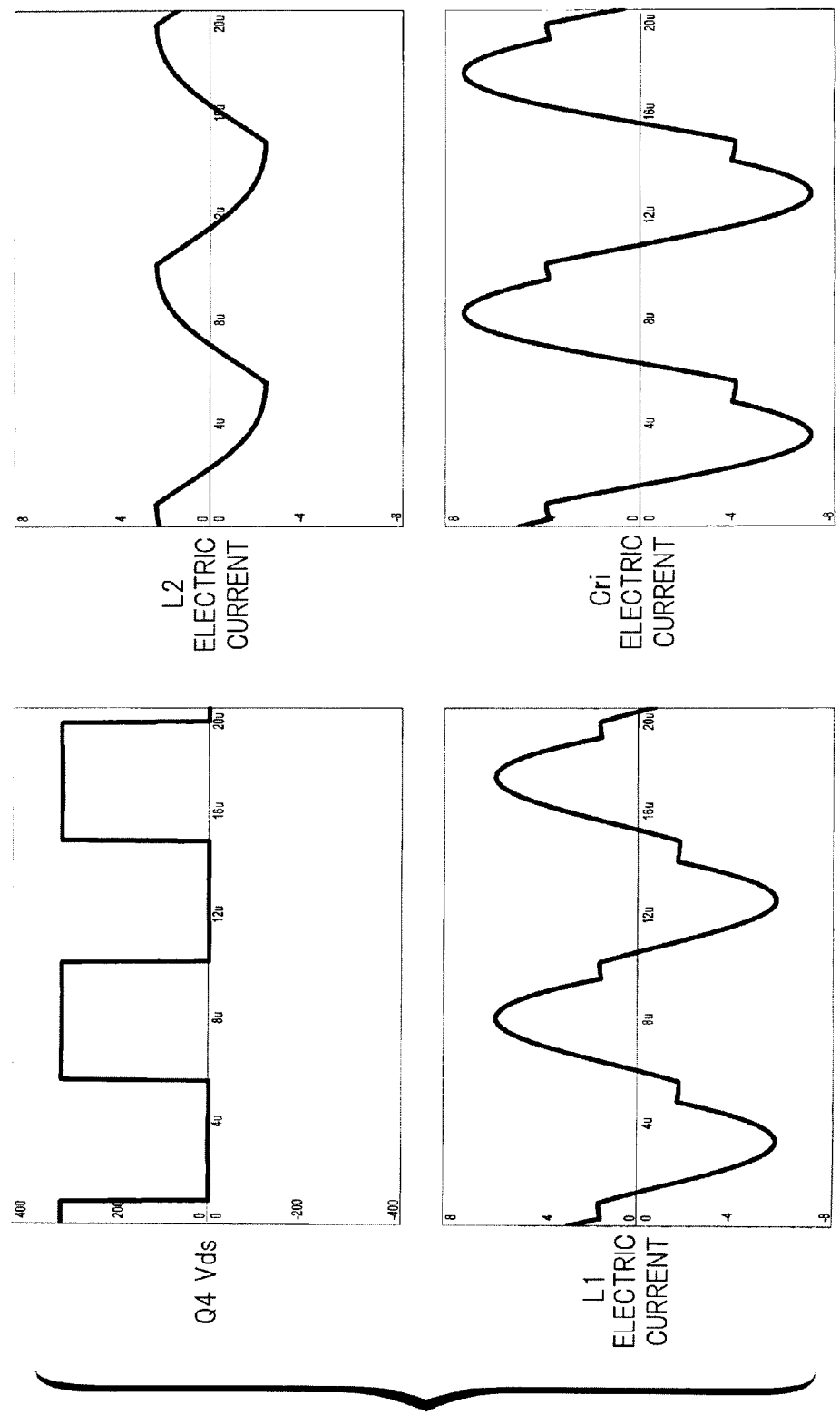
FIG. 3 illustrates an example of an operating waveform of the switching power-supply device 100 shown in FIG. 1.

FIGS. 2 and 3 show examples of an operating waveform of the switching power-supply device 100 shown in FIG. 1. In FIG. 2, "Q2 Vds" indicates a voltage between a source and a drain of the switching element Q2. In FIG. 3, "Q4 Vds" indicates a voltage between a source and a drain of the switching element Q4. FIG. 2 illustrates an operating waveform when the voltage detected by the input voltage detection circuit 4 is the first threshold or larger. FIG. 3 illustrates an operating waveform when the voltage detected by the input voltage detection circuit 4 is lower than the first threshold.

Upon the input of the rated voltage, since the voltage detected by the input voltage detection circuit 4 is the first threshold or larger, the switching control of the series circuit 2 by the driver DR2 is not performed and only the switching control of the series circuit 1 by the driver DR1 is performed. As shown in FIG. 2, as the voltage between the drain and source of the switching element Q2 is changed, the resonance current flowing through the capacitor Cri is changed into a sinusoidal waveform.

On the other hand, when the input voltage is lowered than the rated voltage due to instantaneous interruption or power failure, the voltage detected by the input voltage detection circuit 4 becomes smaller than the first threshold, and the switching control of the series circuit 2 by the driver DR2 starts. At this time, the switching control of the series circuit 1 by the driver DR1 is also continuously performed.

When the switching control of the series circuit 2 starts, the series circuit 1 and the series circuit 2 repeat the switching operations at the same timing because the same clock is input to the drivers DR1 and DR2 from the control circuit 3. When the switching control of the series circuit 2 starts, an excitation current circulating through the primary side flows through the reactor L2, too. For this reason, a current, which is obtained by summing the resonance current flowing through the reactor L1 and primary coil P1 and the excitation current flowing through the reactor L2, flows through the capacitor Cri, so that the excitation current increases in the whole circuit (refer to FIG. 3). Therefore, even when the input voltage is lowered, it is possible to maintain the resonance operation and to make the output voltage constant.

As described above, according to the switching power-supply device 100, when the input voltage is lowered, the excitation current can be increased by the series circuit 2. Therefore, it is possible to supplement a deficiency in the input voltage by the series circuit 2 and to widen the input voltage range. As a result, it is possible to design the reactor L1 and the transformer T in which the excitation current is suppressed as much as possible (it is possible to set a constant, focusing on the efficiency), so that it is possible to configure a highly-efficient power supply. Also, upon the input of the rated voltage, since the current does not flow through the series circuit 2 and there is no circuit device between the series circuit 2 and the power-supply P, it is possible to suppress the increase in conduction loss.

Figure 4:
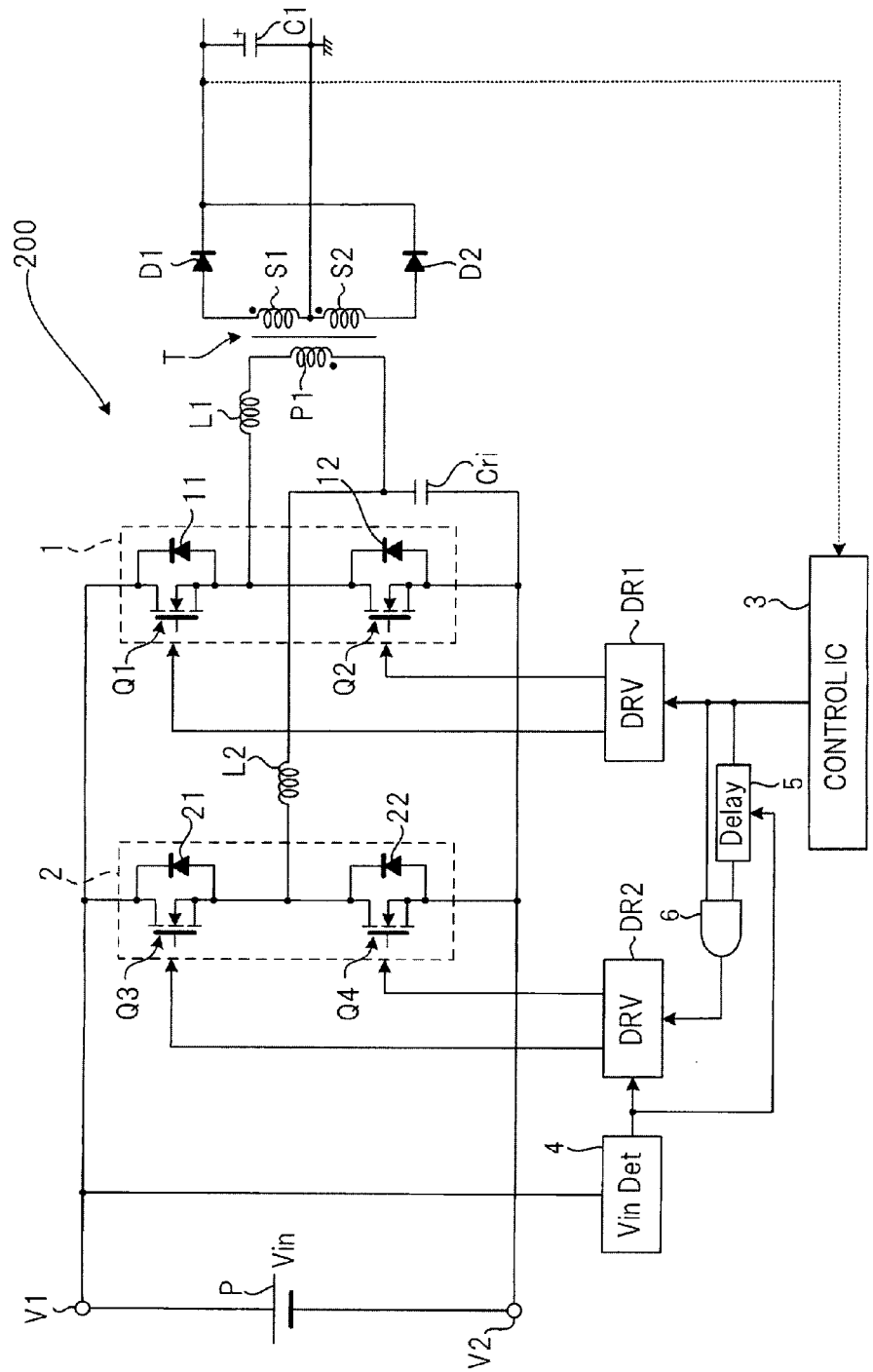
FIG. 4 illustrates an internal configuration of a switching power-supply device 200 that is a modified embodiment of the switching power-supply device 100 shown in FIG. 1.

FIG. 4 illustrates an internal configuration of a switching power-supply device 200 that is a modified embodiment of the switching power-supply device 100 shown in FIG. 1. In FIG. 4, the same configurations as those of FIG. 1 are denoted with the same reference numerals.

The switching power-supply device 200 has the same configuration as the switching power supply 100, except that a delay circuit 5 and an AND circuit 6 are added between the driver DR2 and the control circuit 3. The drivers DR1 and DR2, the control circuit 3, the input voltage detection circuit 4, the delay circuit 5 and the AND circuit 6 function as a control unit.

An output terminal of the AND circuit 6 is connected to the driver DR2. The control circuit 3 and the delay circuit 5 are connected to an input terminal of the AND circuit 6. The control circuit 3 is connected to an input of the delay circuit 5.

The delay circuit 5 delays a clock, which is generated from the control circuit 3, by arbitrary time and outputs the delayed clock to the AND circuit 6. An output signal of the input voltage detection circuit 4 is also input to the delay circuit 5. When the voltage detected by the input voltage detection circuit 4 is lower than the first threshold, the delay circuit 5 delays the clock input from the control circuit 3 and outputs, and when the voltage detected by the input voltage detection circuit 4 is the first threshold or larger, the delay circuit 5 stops the operation thereof.

The delay time set in the delay circuit 5 is set so that a phase of the switching signal to be supplied from the driver DR2 to the series circuit 2 is delayed from that of the switching signal to be supplied from the driver DR1 to the series circuit 1 by 90-degree, for example.

When there is no input from the delay circuit 5, the AND circuit 6 does not output a signal, and when there is an input from the delay circuit 5, the AND circuit 6 outputs the clock that is generated from the control circuit 3 and is delayed in the delay circuit 5.

Operations of the switching power-supply device 200 configured as described above are described.

When the voltage detected by the input voltage detection circuit 4 becomes smaller than the first threshold, the driver DR2 outputs a gate signal and the series circuit 2 starts the switching. At this time, a signal that is enabled to have a delay becoming a phase difference of about 90-degree with respect to the output clock of the control circuit 3 by the delay circuit 5 is input to the driver DR2. Therefore, the series circuit 1 and the series circuit 2 perform the switching operation with the phase difference of 90-degree.

Figure 5:
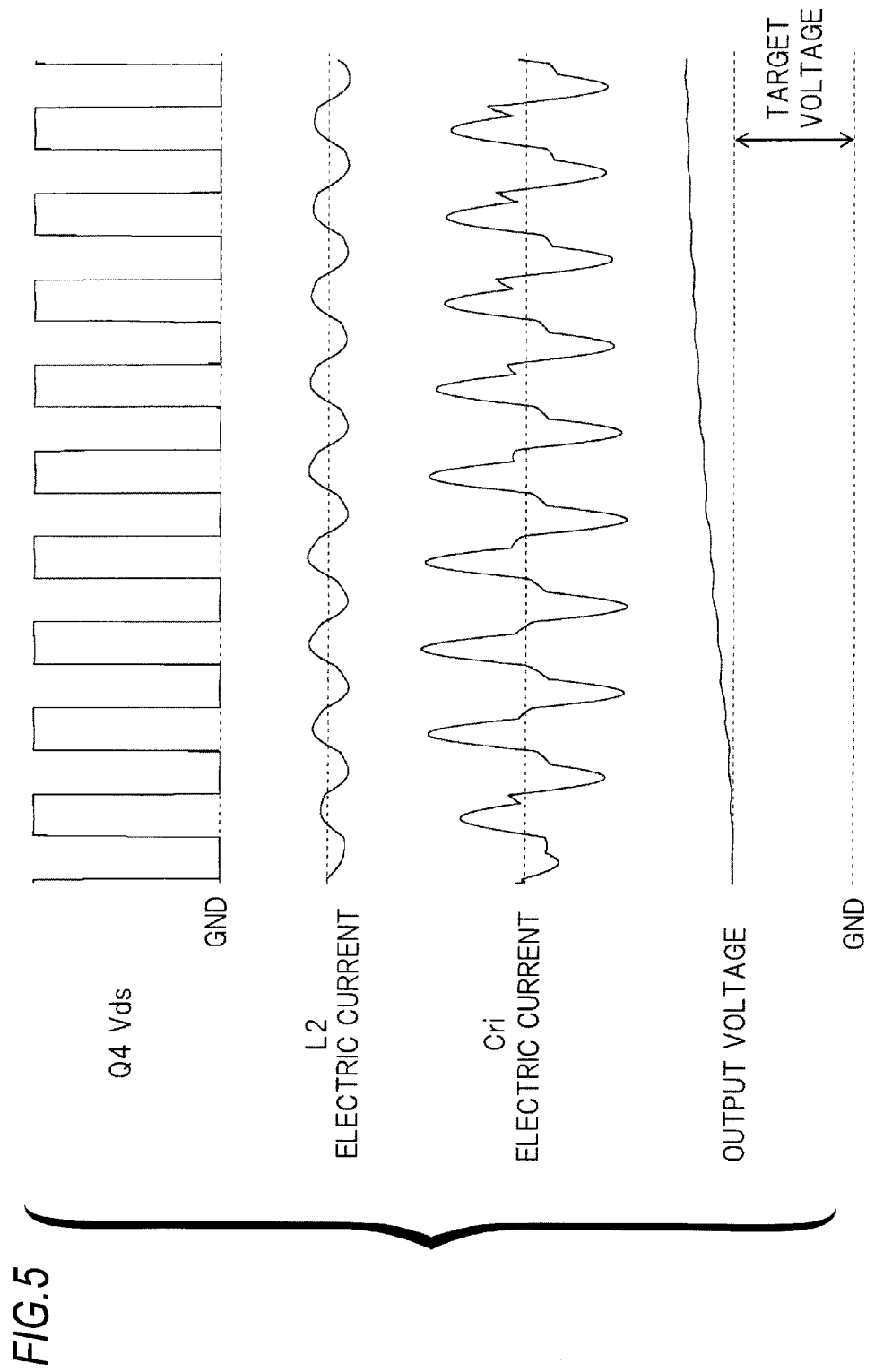
FIG. 5 illustrates an operating waveform when an input voltage of the switching power-supply device 100 (which has a configuration where there is no phase difference between switching signals of series circuits 1 and 2) is lowered.

FIG. 5 illustrates an operating waveform when an input voltage of the switching power-supply device 100 (which has a configuration where there is no phase difference between switching signals of the series circuits 1 and 2) is lowered.

In the switching power supply 100, when the input voltage detection circuit 4 detects the lowering of the input voltage and the series circuit 2 starts the switching, since the excitation current from the reactor L2 flows into the capacitor Cri, the resonance current rapidly increases. When the resonance current of the primary side increases, the current that is output to the secondary side also increases and the output voltage starts to increase. When the output voltage increases, the control circuit 3 increases a switching frequency by the feedback at the secondary side so as to control the output voltage to be constant. However, in an actual circuit, a feedback loop is made to have a somewhat response delay so as to secure the control stability. For this reason, the rapid increase in the resonance current causes an overshoot of the output voltage.

In contrast, according to the switching power-supply device 200, according to the above switching operation having the phase difference, when the resonance current of the reactor L1 and the primary coil P1 flows in a direction of charging the capacitor Cri, the excitation current of the reactor L2 flows in a direction of discharging the capacitor Cri, so that the excitation current from the reactor L2 is canceled each other. For this reason, it is possible to suppress the rapid increase in the resonance current and the overshoot of the output voltage.

Figure 6:
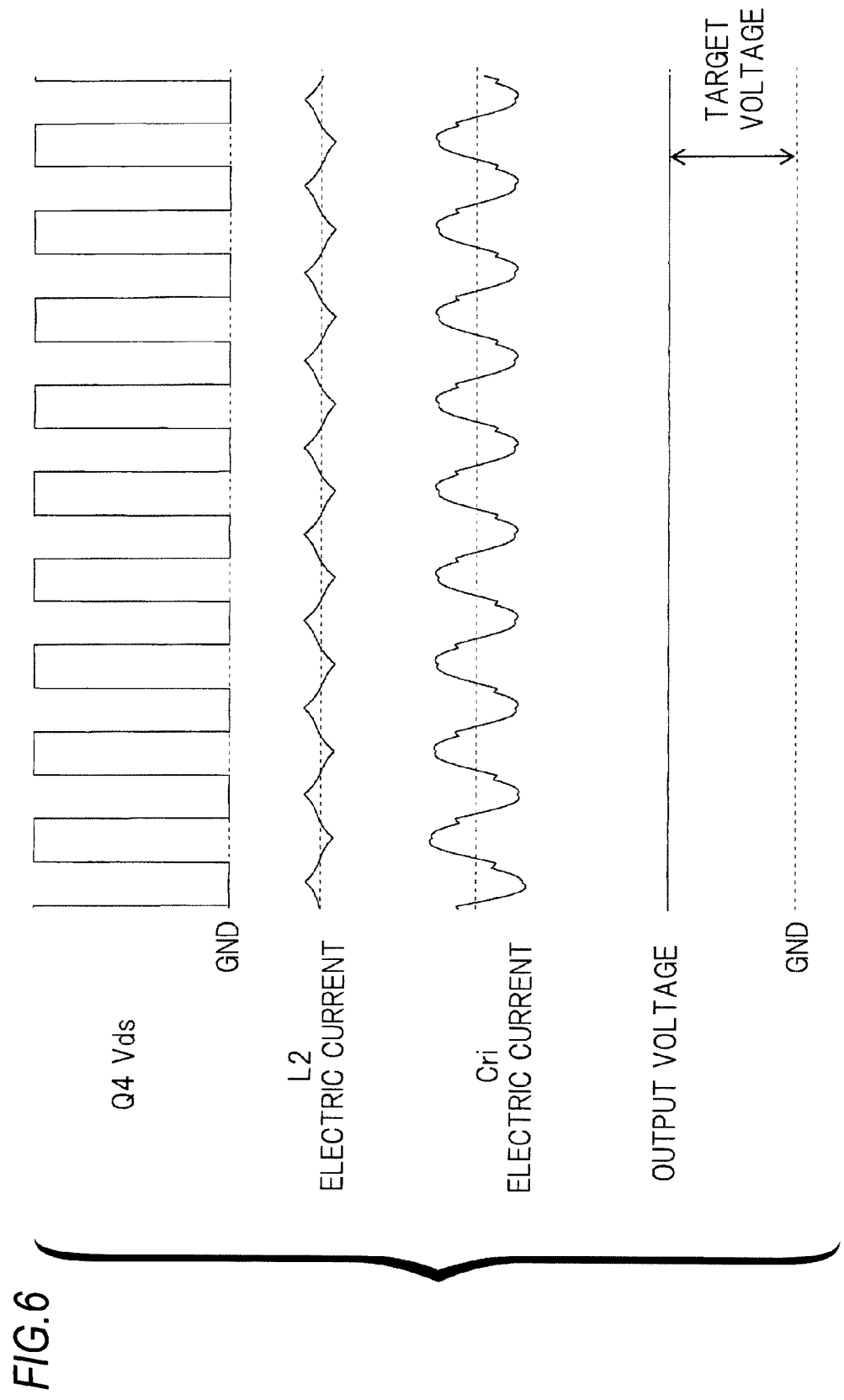
FIG. 6 illustrates an operating waveform when an input voltage of the switching power-supply device 200 (which has a configuration where there is a 90-degree phase difference between the switching signals of the series circuits 1 and 2) is lowered.

FIG. 6 illustrates an operating waveform when the input voltage of the switching power-supply device 200 (which has a configuration where there is a 90-degree phase difference between the switching signals of the series circuits 1 and 2) is lowered.

The phase of the switching signal of the series circuit 2 is delayed by about 90-degree with respect to the phase of the switching signal of the series circuit 1, so that the overshoot of the output voltage can be suppressed, as shown in FIG. 6. A magnitude of the phase difference is arbitrary and is made to be about 90-degree, so that the increase in the resonance current can be suppressed.

Additionally, the delay time that is set for the delay circuit 5 may be made to be variable. Specifically, when the voltage detected by the input voltage detection circuit 4 is lower than the first threshold, the delay circuit 5 sets the delay time so that the phase difference is larger (90-degree, in the above illustrative embodiment) than a minimum value. After the switching control of the series circuit 2 starts, the delay circuit reduces the delay time according to elapsed time, from the start of the switching control and finally sets the delay time to be zero.

As described above, when the delay time is gradually reduced and becomes zero, the same operation as the switching power supply 100 is performed. Therefore, similarly to the switching power supply 100, it is possible to constantly maintain the output voltage over the wide input voltage range.

In the switching power-supply device 200, the switching signal of the series circuit 2 is delayed with respect to the switching signal of the series circuit 1. However, even when the switching signal of the series circuit 1 is delayed with respect to the switching signal of the series circuit 2, the same effect is obtained.

Figure 7:
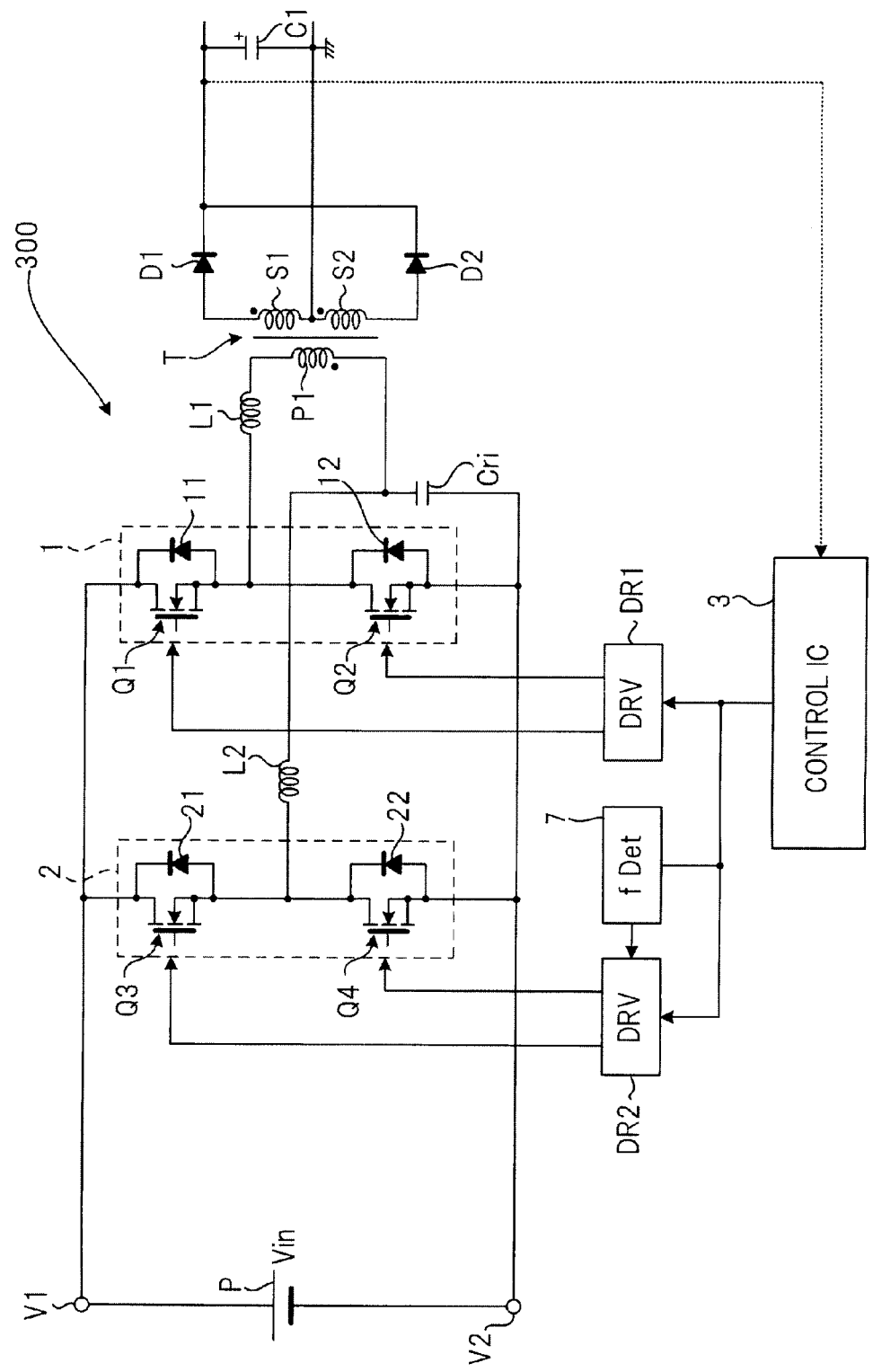
FIG. 7 illustrates a schematic configuration of a switching power supply 300 that is a modified embodiment of the switching power-supply device 100.

FIG. 7 illustrates a schematic configuration of a switching power supply 300 that is a modified embodiment of the switching power-supply device 100. In FIG. 7, the same configurations as those of FIG. 1 are denoted with the same reference numerals.

The switching power supply 300 has the same configuration as the switching power supply 100, except that a frequency detection circuit 7 is provided instead of the input voltage detection circuit 4. In the switching power supply 300, the drivers DR1 and DR2, the control circuit 3 and the frequency detection circuit 7 function as a control unit.

The frequency detection circuit 7 detects a frequency of the clock that is output from the control circuit 3, outputs a high-level signal to the driver DR2 when the detected frequency is lower than a second threshold and outputs a low-level signal to the driver DR2 when the detected frequency is the second threshold or larger.

The control circuit 3 controls the frequency of the clock generated in the oscillator so that an output voltage approximates to a target value, by the feedback loop. When a voltage that is input to the switching power supply 300 is lowered or a load is increased, the control circuit 3 performs control of enabling the clock frequency to approximate to the resonance frequency so as to maintain the output voltage. That is, the frequency of the clock that is output from the control circuit 3 is changed in conjunction with the voltage that is input to the switching power supply 300 or the load that is connected to the switching power supply 300.

Therefore, when a signal input from the frequency detection circuit 7 is a high level (the detected frequency is lower than the second threshold), the driver DR2 starts to supply a switching signal to the series circuit 2, thereby supplementing the deficiency in the input voltage. When a signal input from the frequency detection circuit 7 is a low level (the detected frequency is the second threshold or larger), the driver DR2 stops supplying the switching signal to the series circuit 2.

As described above, even in the configuration where the operation of the series circuit 2 is enabled to stop or start by the magnitude of the frequency of the switching signal, it is possible to widen the input voltage range, similarly to the switching power supply 100.

Also in the switching power supply 300, when the signal input from the frequency detection circuit 7 becomes a high level and the series circuit 1 and thus the series circuit 2 perform the switching control, the phase difference between the switching signal of the series circuit 1 and the switching signal of the series circuit 2 may be controlled, similarly to the switching power-supply device 200. Also, the phase difference may be reduced according to elapsed time, after each of the series circuit 1 and the series circuit 2 starts the switching control.

Although this disclosure has been descried with reference to the illustrative embodiments, the illustrative embodiments are just exemplary and can be changed and implemented without departing from the scope of this disclosure.

As described above, the specification discloses the following.

A disclosed switching power-supply device of the disclosure includes a transformer, which has a primary coil and a second coil that is magnetically coupled with the primary coil; a first series circuit of a first switching element and a second switching element, the first series circuit being connected to both ends of a direct-current power supply; a series resonance circuit, which includes a capacitor connected to one end of the second switching element and the primary coil connected between the capacitor and the other end of the second switching element; a second series circuit of a third switching element and a fourth switching element, the second series circuit being connected to both ends of the direct-current power supply; a reactor, which is connected between a connection point of the third switching element and the fourth switching element and a terminal of the capacitor facing the primary coil; a rectification-and-smoothing circuit, which is connected to the secondary coil, and a control unit that performs: switching control of turning on-and-off the first switching element and the second switching element, alternately, with dead time in which the first switching element and the second switching element become off; and switching control of turning on-and-off the third switching element and the fourth switching element, alternately, with dead time in which the third switching element and the fourth switching element become off while making frequencies of switching signals of the first series circuit and the second series circuit be the same, the control unit selectively switches and performs: a first control of performing the switching control of the first series circuit at a state where the switching control of the second series circuit is stopped; and a second control of performing the switching control of the second series circuit at a state where the switching control of the first series circuit is performed.

In the disclosed switching power-supply device, the control unit performs: the first control when a voltage that is input from the direct-current power supply is a first threshold or larger; and the second control when the voltage that is input from the direct-current power supply is lower than the first threshold.

In the disclosed switching power-supply device, the control unit controls a phase difference of the switching signals of the first series circuit and the second series circuits when performing the second control.

In the disclosed switching power-supply device, the control unit reduces the phase difference according to elapsed time, after starting the second control at a state where the phase difference is made to be larger than a minimum value.

In the disclosed switching power-supply device, the control unit controls a frequency of the switching signal, depending on an output voltage of the rectification-and-smoothing circuit, and the control unit performs: the first control when a frequency of the switching signal is a second threshold or larger; and the second control when the frequency of the switching signal is lower than the second threshold.

In the disclosed switching power-supply device, the control unit controls a phase difference of the switching signals of the first series circuit and the second series circuits when performing the second control.

In the disclosed switching power-supply device, the control unit reduces the phase difference according to elapsed time, after starting the second control at a state where the phase difference is made to be larger than a minimum value.

DESCRIPTION OF REFERENCE NUMERALS

100: switching power-supply device
1, 2: series circuit
3: control circuit
4: input voltage detection circuit
5: delay circuit
6: AND circuit
7: frequency detection circuit
V1, V2: input-side terminal
P: direct-current power supply L1, L2: reactor
P1: primary coil
S1, S2: secondary coil
Q1 to Q4: switching element
DR1, DR2: driver
Cri, C1: capacitor
T: transformer
D1, D2, 11, 12, 21, 22: diode

What is claimed is:

1. A switching power-supply device comprising:
 a transformer, which has a primary coil and a secondary coil that is magnetically coupled with the primary coil;
 a first series circuit of a first switching element and a second switching element, the first series circuit being connected to both ends of a direct-current power supply;
 a series resonance circuit, which includes a capacitor connected to one end of the second switching element and the primary coil connected between the capacitor and the other end of the second switching element;
 a second series circuit of a third switching element and a fourth switching element, the second series circuit being connected to both ends of the direct-current power supply;
 a reactor, which is connected between a connection point of the third switching element and the fourth switching element and a terminal of the capacitor facing the primary coil;
 a rectification-and-smoothing circuit, which is connected to the secondary coil, and
 a control unit that performs:
  switching control of turning on-and-off the first switching element and the second switching element, alternately, with dead time in which the first switching element and the second switching element become off; and
  switching control of turning on-and-off the third switching element and the fourth switching element, alternately, with dead time in which the third switching element and the fourth switching element become off while making frequencies of switching signals of the first series circuit and the second series circuit be the same,
 wherein the control unit selectively switches and performs:
  a first control of performing the switching control of the first series circuit at a state where the switching control of the second series circuit is stopped; and
  a second control of performing the switching control of the second series circuit at a state where the switching control of the first series circuit is performed.

2. The switching power-supply device according to claim 1, wherein the control unit performs:
 the first control when a voltage that is input from the direct-current power supply is a first threshold or larger; and
 the second control when the voltage that is input from the direct-current power supply is lower than the first threshold.

3. The switching power-supply device according to claim 2, wherein the control unit controls a phase difference of the switching signals of the first series circuit and the second series circuit when performing the second control.

4. The switching power-supply device according to claim 3, wherein the control unit reduces the phase difference according to elapsed time, after starting the second control at a state where the phase difference is made to be larger than a minimum value.

5. The switching power-supply device according to claim 1,
 wherein the control unit controls a frequency of the switching signal, depending on an output voltage of the rectification-and-smoothing circuit, and
 wherein the control unit performs:
  the first control when a frequency of the switching signal is a second threshold or larger; and
  the second control when the frequency of the switching signal is lower than the second threshold.

6. The switching power-supply device according to claim 5, wherein the control unit controls a phase difference of the switching signals of the first series circuit and the second series circuit when performing the second control.

7. The switching power-supply device according to claim 6, wherein the control unit reduces the phase difference according to elapsed time, after starting the second control at a state where the phase difference is made to be larger than a minimum value.

* * * * *